UNITED STATES PATENT OFFICE.

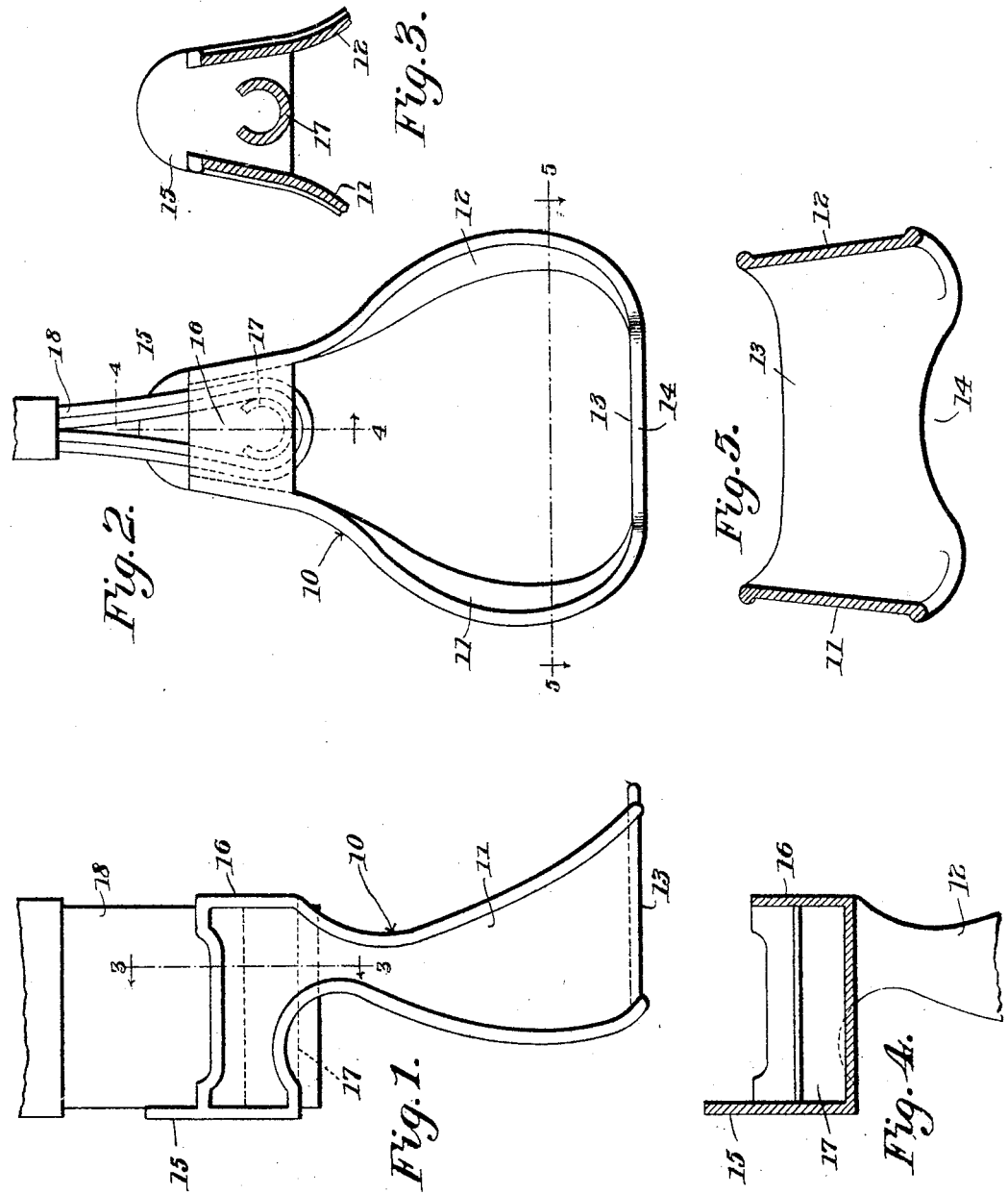

FREDERICK WALLACE BANTZ, OF DALLAS, TEXAS.

STIRRUP.

No. 803,740. Specification of Letters Patent. Patented Nov. 7, 1905.

Application filed April 29, 1905. Serial No. 258,043.

*To all whom it may concern:*

Be it known that I, FREDERICK WALLACE BANTZ, a citizen of the United States, residing at Dallas, in the county of Dallas and State of Texas, have invented a new and useful Stirrup, of which the following is a specification.

This invention relates to the stirrups of riding-saddles, and has for its object to improve the construction and increase the efficiency of devices of this character.

With these and other objects in view, which will appear as the nature of the invention is better understood, the same consists in certain novel features of construction as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a side elevation, and Fig. 2 is a rear elevation, of the improved stirrup. Fig. 3 is a detail of the upper portion of the stirrup-frame in section on the line 3 3 of Fig. 1. Fig. 4 is a detail in section on the line 4 4 of Fig. 2. Fig. 5 is a transverse section on the line 5 5 of Fig. 2.

The improved device comprises a main frame (represented as a whole at 10) with spaced curving sides 11 12 and foot-tread 13, the sides inclining inwardly from front to rear and the foot-tread having a central depression 14 in its rear edge, as shown in Fig. 5. The converging sides of the frame confine the foot of the rider and prevent it from being thrust into the frame beyond a certain predetermined distance, thus accomplishing two important results—namely, effectually preventing the foot from "hanging" in the stirrup in event of the rider being thrown from the horse and likewise preventing the shin of the rider from coming in contact with the stirrup-leather and rubbing the same. The depression 14 in the tread 13 is also an important feature of the invention, as the heel of the rider enters this depression, and the foot is thereby held from lateral movement and maintains the pressure at the center of the tread portion.

The side portions 11 12 of the frame converge toward the upper ends and are connected at front and rear, respectively, by transverse guard-plates 15 16, the forward plate 15 extending above the upper line of the side portions, as shown. Connecting the plates 15 16 midway between the converging side portions 11 12 is a bar 17, preferably hollow and disposed at the bottom line of the plates, as shown in Fig. 3. The stirrup-strap, a portion of which is represented at 18, is connected to the bar 17 and passes upward between the sides 11 12 and the bar, the converging of the sides serving an important purpose in confining the strap and preventing undue spreading of the same. The confining of the straps thus prevents the knees of the rider from working between the guard or fender and the stirrup-straps or between the two parts of the stirrup-straps. The elevation of the forward plate 15 is also an important feature of the invention, as a stop is thereby formed against which the strap 18 bears to prevent the tilting of the stirrup when pressure is applied to the tread 13.

It will be noted that the bar 17 holds the strap 18 in position without twisting the latter, which is an important advantage, as will be obvious.

The novel construction of the device causes the stirrup-leathers to hang straight and obviates the bending of the leather by the pressure of the foot of the rider and also prevents the stirrup-leathers from rubbing the shin.

The stirrup always hangs in the right position for the reception of the foot of the rider when about to mount.

The device will preferably be cast in one piece, but may be partially or wholly of wood or other material, if found necessary.

Having thus described the invention, what is claimed is—

1. In a stirrup a frame having spaced sides converging toward the forward edges, and a tread connecting said sides and provided with a heel-receiving recess in its rear side.

2. In a stirrup, a frame comprising spaced sides connected at one end by a transverse tread and converging toward the other end, spaced plates connecting said converging side portions at front and rear, and with the forward plate extended above the side portions of the frame and a strap-bar connecting said plates between said side portions.

3. A stirrup comprising spaced sides, a tread connecting the lower ends of the sides, plates carried by the upper ends of the sides and extending forwardly therefrom, front and rear plates connecting corresponding ends of the side plates, and a strap-bar extending between the front and rear plates, the front plate extending above the other plates to form a strap-engaging stop.

In testimony that I claim the foregoing as my own I have hereto affixed my signature in the presence of two witnesses.

FREDERICK WALLACE BANTZ.

Witnesses:
T. OTIS POTTS,
JOHN C. ANDERSON.